(12) United States Patent
Seeley

(10) Patent No.: US 8,353,521 B1
(45) Date of Patent: Jan. 15, 2013

(54) TRAILER CADDY

(76) Inventor: Roger Leroy Seeley, Chester, SD (US)

( * ) Notice: Subject to any disclaimer, the term of this patent is extended or adjusted under 35 U.S.C. 154(b) by 0 days.

(21) Appl. No.: 13/417,420

(22) Filed: Mar. 12, 2012

Related U.S. Application Data

(60) Provisional application No. 61/502,411, filed on Jun. 29, 2011.

(51) Int. Cl.
*B62D 53/08* (2006.01)

(52) U.S. Cl. .................................................. 280/417.1

(58) Field of Classification Search .............. 280/417.1, 280/416.1, 416.3, 418, 441.2, 490.1, 491.2, 280/415.1, 476.1, 425.2
See application file for complete search history.

(56) References Cited

U.S. PATENT DOCUMENTS

| | | | | |
|---|---|---|---|---|
| 3,593,858 A * | 7/1971 | Ruffin | | 212/88 |
| 3,881,749 A * | 5/1975 | Berends | | 280/417.1 |
| 4,310,997 A * | 1/1982 | Streicher | | 56/15.9 |
| 4,832,358 A * | 5/1989 | Bull | | 280/418.1 |
| 5,324,061 A * | 6/1994 | Lay | | 280/417.1 |
| 5,520,404 A * | 5/1996 | Schulte | | 280/460.1 |
| 5,566,964 A * | 10/1996 | Leonard | | 280/417.1 |
| 5,797,614 A * | 8/1998 | Hord et al. | | 280/417.1 |
| 6,109,640 A * | 8/2000 | Allen et al. | | 280/417.1 |
| 6,203,046 B1 | 3/2001 | Meurer | | |
| 6,474,673 B1 | 11/2002 | Biggins | | |
| 6,481,948 B2 | 11/2002 | Spears | | |
| 7,029,019 B1 * | 4/2006 | Dye | | 280/416.2 |
| 7,552,933 B1 * | 6/2009 | Beckman | | 280/204 |
| 8,151,426 B2 * | 4/2012 | Schneider | | 29/401.1 |
| 8,210,557 B2 * | 7/2012 | Schneider | | 280/417.1 |
| 2006/0076754 A1 * | 4/2006 | Jamieson | | 280/476.1 |
| 2009/0115162 A1 | 5/2009 | Lybrook et al. | | |
| 2010/0199898 A1 | 8/2010 | Jensen | | |

* cited by examiner

*Primary Examiner* — Tashiana Adams
(74) *Attorney, Agent, or Firm* — Etherton Law Group, LLC; Sandra L. Etherton; Benjamin D. Tietgen

(57) ABSTRACT

A trailer caddy is provided for enabling a user to tow or otherwise maneuver trailers or agricultural equipment with a light-duty pickup truck that would otherwise have too great of a tongue weight for towing behind a pickup truck. The caddy includes a trailer chassis with at least one axle having wheels mounted thereon. A fifth-wheel hitch having a frame is configured so that the frame is affixed to the chassis such that the frame faces opposite the chassis. The caddy also includes a hitch assembly configured to connect to various hitch styles.

10 Claims, 12 Drawing Sheets

TRAILER CADDY

CROSS-REFERENCE TO RELATED APPLICATIONS

The present application claims the priority of U.S. Provisional Application Ser. No. 61/502,411 entitled "IMPLEMENT AND TRAILER CADDY" which was filed Jun. 29, 2011, and is incorporated by reference.

TECHNICAL FIELD

The subject disclosure relates generally to trailer apparatus for moving towed articles (e.g., agricultural implements, trailers, semi-trailers and the like), and more specifically relates to a trailer caddy apparatus and method characterized by a towable fifth wheel trailer having one or more axles for supporting the tongue weight of an object to be moved.

BACKGROUND

Trailer hitching, in various means, has been in existence for some time. Trailer hitches enable their users with a means for connecting a trailer or other implement to a hitch, so that the trailer or other implement can be repositioned or towed. The public has welcomed the chance to move their belongings inexpensively to their intended destination, and to have the peace of mind of having control over their possessions en route. By way of background concerning some conventional systems, it is frequently desired by individuals to reposition towable articles (e.g., such as agricultural implements, trailers and the like). To effect movement upon a trailer, a tow vehicle (e.g., such as a tractor, truck or the like) is coupled to the trailer. The tow vehicle must be adequately robust to support the tongue weight of the trailer. For trailers with heavy tongue weights, specialized tow vehicles can be required to support the tongue weight while imparting motion on the trailer.

For example, moving a fifth wheel trailer with a gooseneck hitch that is carrying sufficient weigh can require the use of a heavy-duty pickup truck, such that the weight of the gooseneck is born by the axles of the pickup truck. Contrariwise, moving an agricultural implement with sufficient tongue weight having a conventional tow hitch may exceed the towing capabilities (e.g., of the bumper if the implement is hitched to the bumper or of the vehicle frame if the implement is hitched to a receiver hitch mounted to the frame of the vehicle) of even a heavy-duty pickup truck, and can require the use of a drawbar on an agricultural tractor capable of bearing the tongue weight. For moving implements utilizing a two-point hitch (e.g., such as some large planters, drills and air seeders), an even additional tow vehicle can be required.

A tow hitch is a device attached to the chassis of a vehicle for towing. A tow hitch can take the form of a tow-ball to allow for swiveling and articulation of a trailer, or a tow pin and jaw with a trailer loop (e.g., a drawbar)—often used for large or agricultural vehicles where slack in the pivot pin allows the same movements.

A fifth wheel hitch is a type of hitch designed for carrying much heavier loads than the typical ball hitch can handle. In a fifth wheel trailer scenario, the front edge of a trailer (e.g., the gooseneck) extends over the rear bumper of a pickup truck. The attachment point is in the bed of the truck, not at the rear bumper as with a tow hitch. The attachment point is either a large flat plate having a horseshoe shape for receiving a ball mounted to the gooseneck or simply a king-pin to be coupled to the gooseneck with a coupler. In either situation, the attachment point is located ahead of the rear axle of the pickup truck, dispersing the weight of the trailer between both the front and rear pickup truck axles, allowing the truck to handle significantly more weight than when weight is distributed only on the rear axle. The trailer connects to the fifth wheel hitch plate via a downward facing pin, commonly referred to as a king pin. The king pin locks into position so that the hitch can pivot to accommodate turns.

A two-point hitch is often used to attach agricultural implements to agricultural tractors. The two-point hitch comprises two movable arms. The two arms are controlled by the hydraulic system of a tractor and are used for lifting and lowering an implement mounted thereon. Each arm has a terminal end facing away from the associated agricultural tractor. Near the terminal end is located an articulating ball receiver, which has a cylindrical opening through it for receiving a pin, used to attach an implement to the tractor. The articulating ball receiver can be articulated in relation to the arm so that a pin can be passed through both the two-point hitch and the ball, coupling the tractor to the implement. In a common variation of the two-point hitch, called a three-point hitch, a third, center arm is added, referred to as the top link. It is movable, but typically not powered.

However, the use of conventional hitches carries with it a variety of deficiencies. One such deficiency conventionally associated with the use of a hitch is that a tow vehicle having particular towing characteristics (e.g., maximum tongue weight) is required for trailers and implements having certain tongue weights. For example, this may prevent the use of a light-duty half-ton pickup truck to tow a heavy fifth-wheel trailer.

Another deficiency conventionally associated with the use of conventional hitches is that certain trailers and implements require tow vehicles equipped with certain types or styles of hitches. For example, an implement that requires a two-point hitch cannot be towed by any type of pickup truck because pickup trucks cannot conventionally be equipped with a two-point hitch. Instead, implements requiring a two-point hitch must be towed with an agricultural tractor or other tow vehicle having a two-point hitch. Another example is that a fifth-wheel trailer cannot be towed by a pickup truck that is not configured to receive a fifth-wheel trailer. Instead, a pickup truck having the requisite fifth-wheel hardware must be used to tow a fifth-wheel trailer.

Accordingly, there is a need to provide an trailer caddy to permit a trailer having one type of hitch to be towed by a pickup truck having fifth-wheel hardware mounted in the bed of the pickup truck and to ensure that the trailer caddy is easily removable from the trailer to permit the trailer to be towed by a vehicle having the type of hitch receiver to mate with the hitch embodied by the trailer.

The above-described deficiencies of today's towing methods are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

A trailer caddy is provided for enabling a user to tow or otherwise maneuver trailers or agricultural equipment with a light-duty pickup truck that would otherwise have too great of a tongue weight for towing behind a pickup truck. The caddy includes a trailer chassis with at least one axle having wheels mounted thereon. A fifth-wheel hitch having a frame is configured so that the frame is affixed to the chassis such that the frame faces opposite the chassis. The caddy also includes a hitch assembly configured to connect to various hitch styles.

These and other embodiments are described in more detail below.

BRIEF DESCRIPTION OF THE DRAWINGS

Various non-limiting embodiments are further described with reference to the accompanying drawings in which.

DETAILED DESCRIPTION

Figure 1:
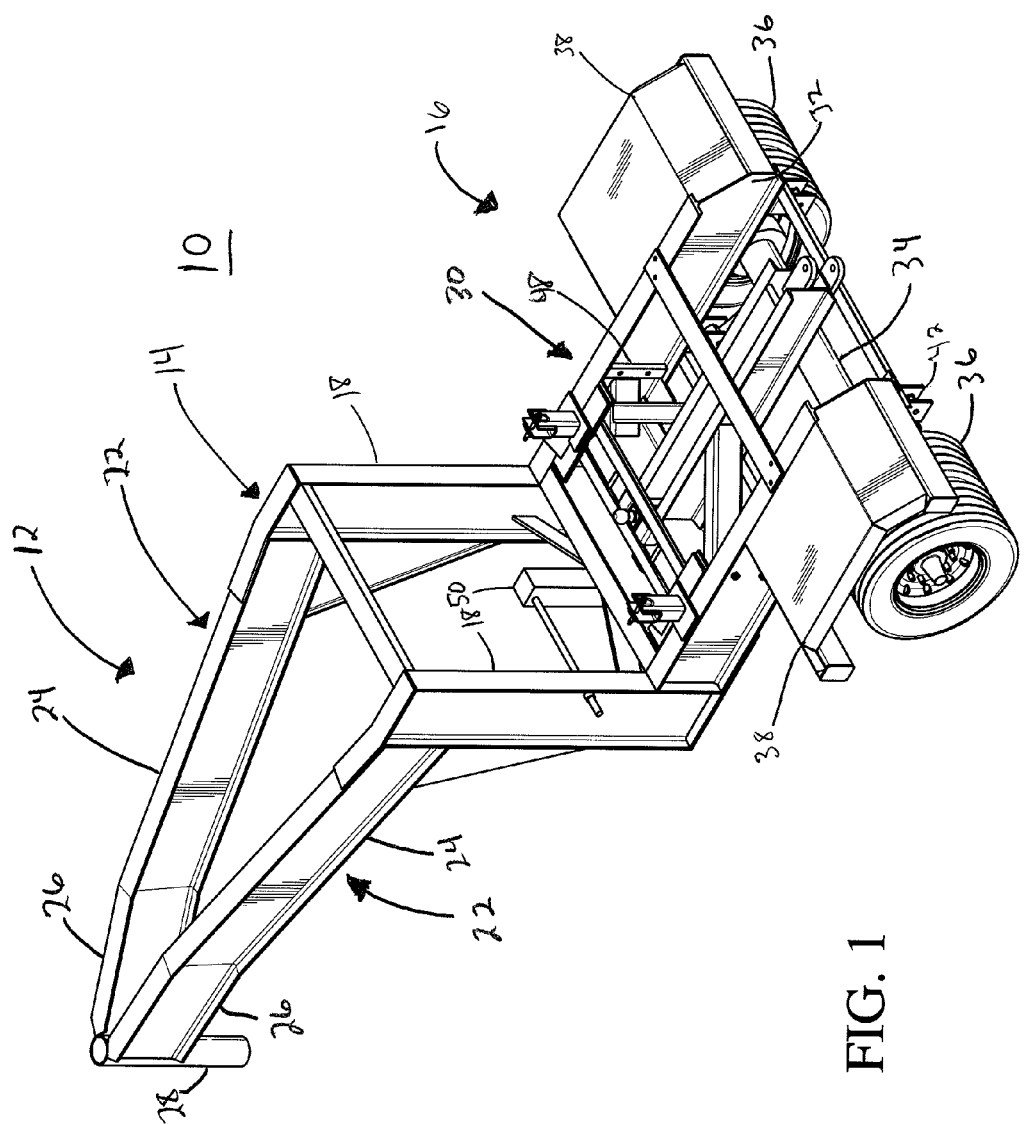
FIG. 1 is a schematic perspective view of a trailer caddy according to an embodiment with a single axle.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well known structures and devices are shown in block diagram form in order to facilitate describing the claimed subject matter.

The word "exemplary" is used herein to meat serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, with reference initially to FIG. 1, a trailer connection assembly 20 for adapting trailers with a variety of hitches to a fifth-wheel (e.g., gooseneck) trailer hitch 12 is mounted on a rear portion 16 of a single- or multi-axle trailer frame forming a trailer caddy 10. A front portion 14 is opposite a rear portion 16 of the trailer caddy 10. The front portion 14 is for connecting to a vehicle for towing the trailer caddy 10. The rear portion of the fifth-wheel trailer hitch 12 has one or more posts 18 with an upper end and a lower end. According to an embodiment, the rear portion 16 is for removably receiving the trailer connection assembly 20 and supporting the trailer connection assembly 20 above the ground with a single- or multi-axle trailer chassis.

Figure 2:
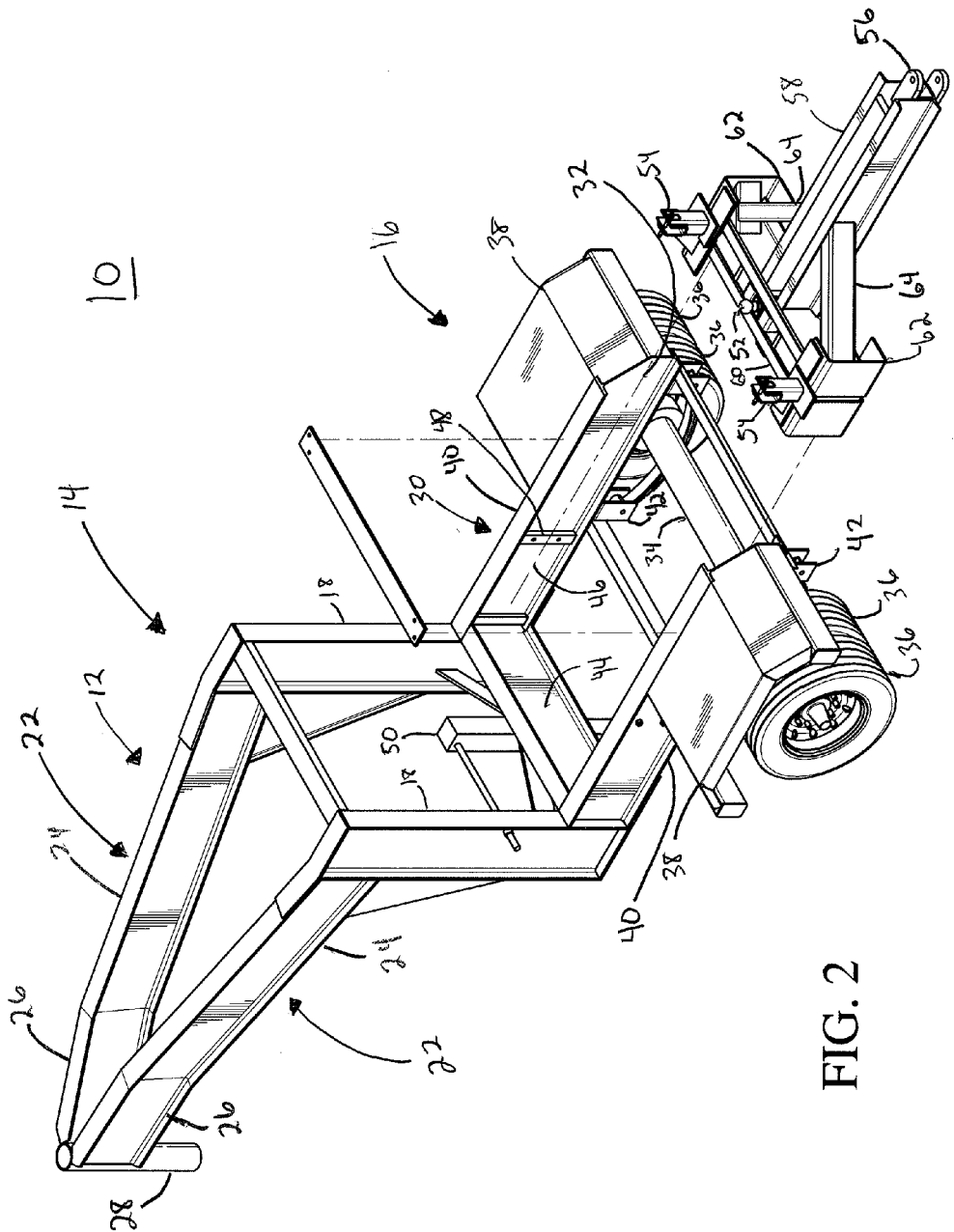
FIG. 2 is a schematic exploded perspective view of a trailer caddy according to an embodiment with a single axle.
Figure 3:
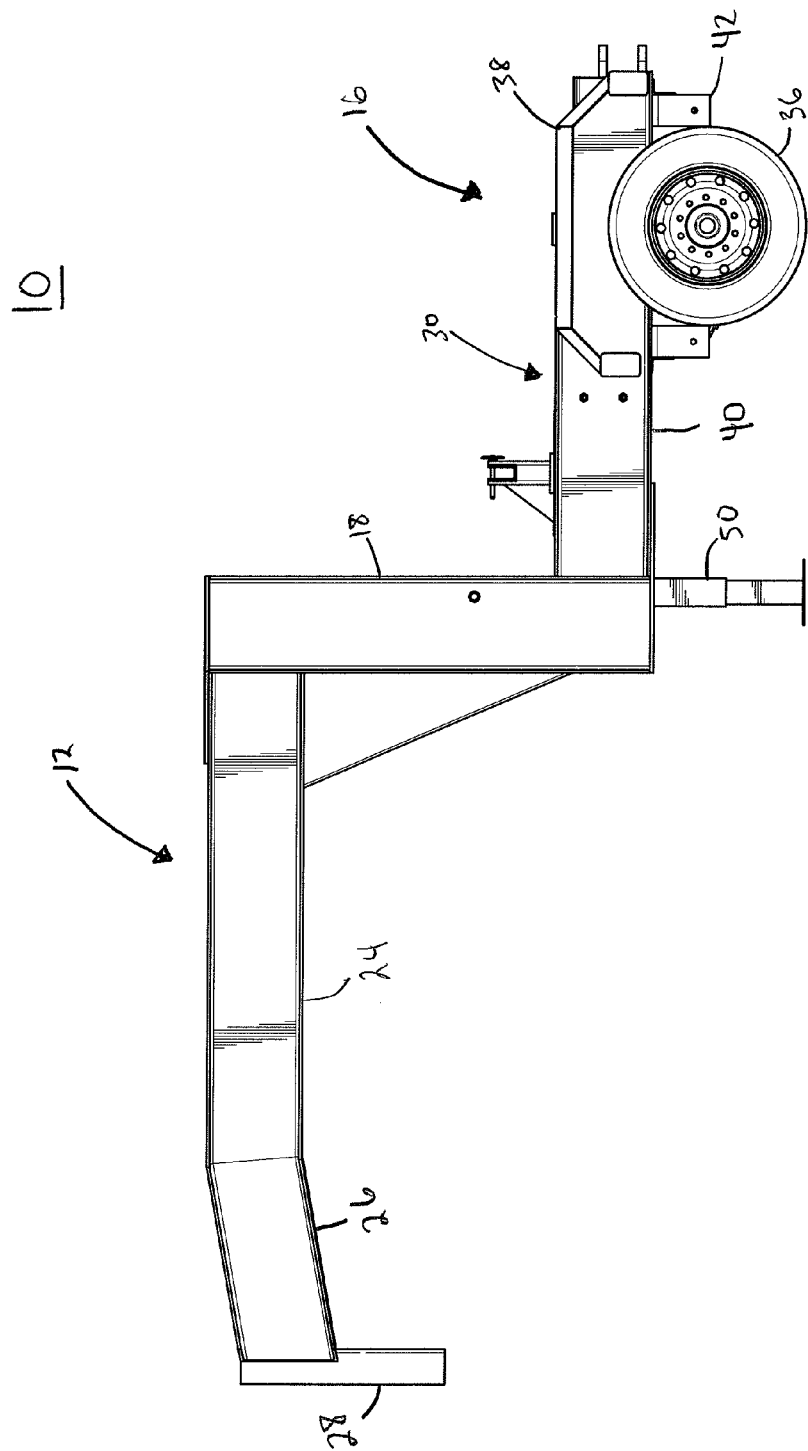
FIG. 3 is a schematic side view of a trailer caddy according to an embodiment with a single axle.
Figure 4:
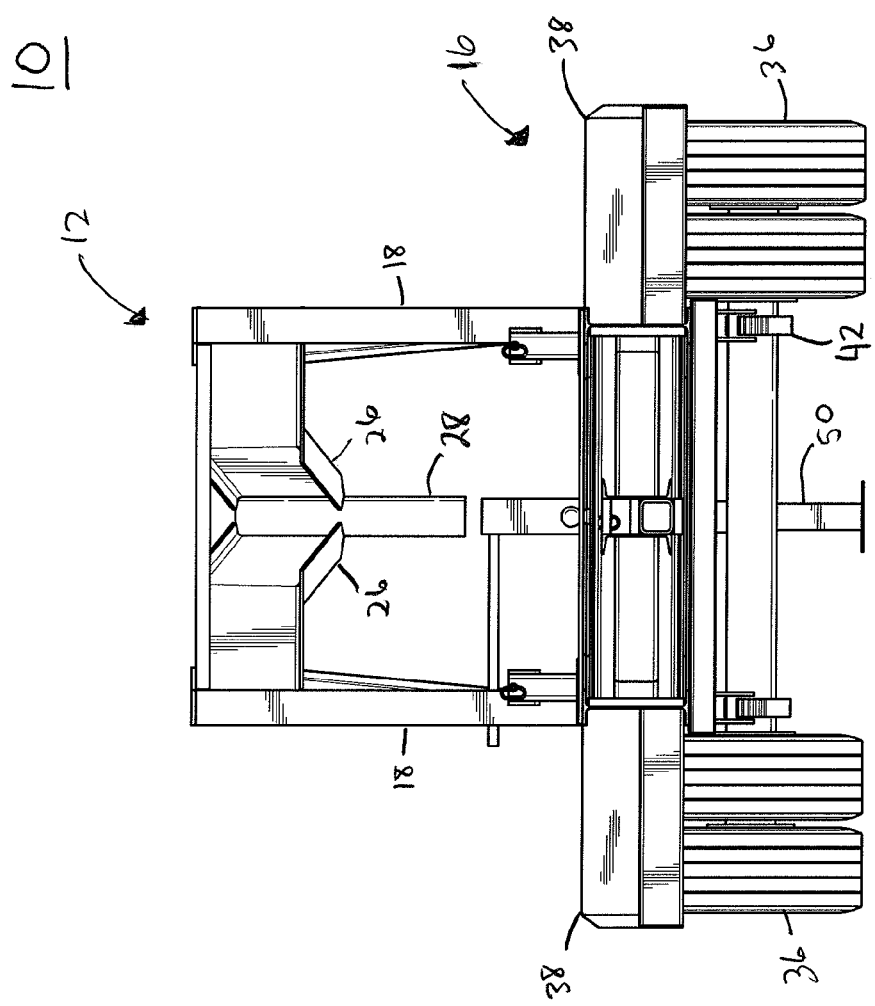
FIG. 4 is a schematic rear view of a trailer caddy according to an embodiment with a single axle.
Figure 5:
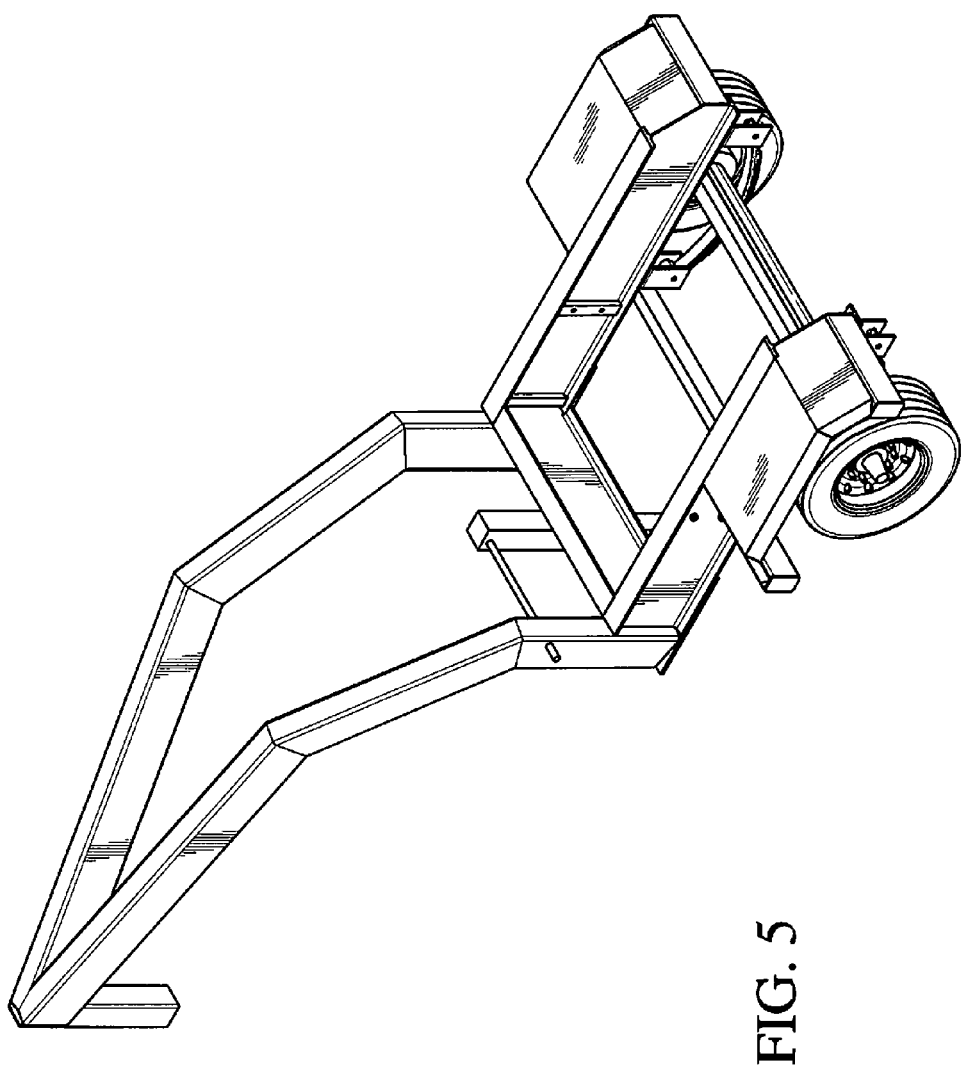
FIG. 5 is a schematic perspective view of a trailer caddy according to an embodiment with a single axle.
Figure 6:
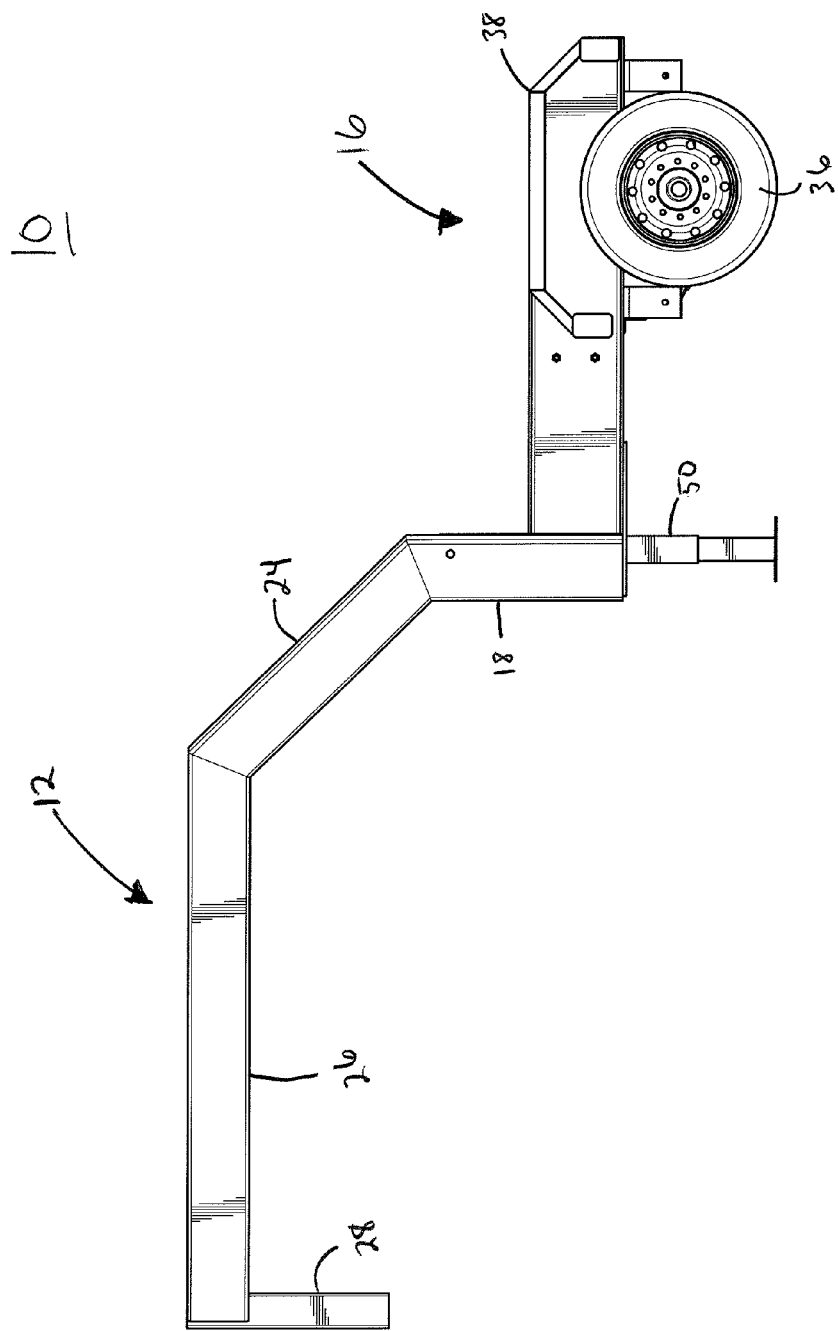
FIG. 6 is a schematic side view of a trailer caddy according to an embodiment with a single axle.
Figure 7:
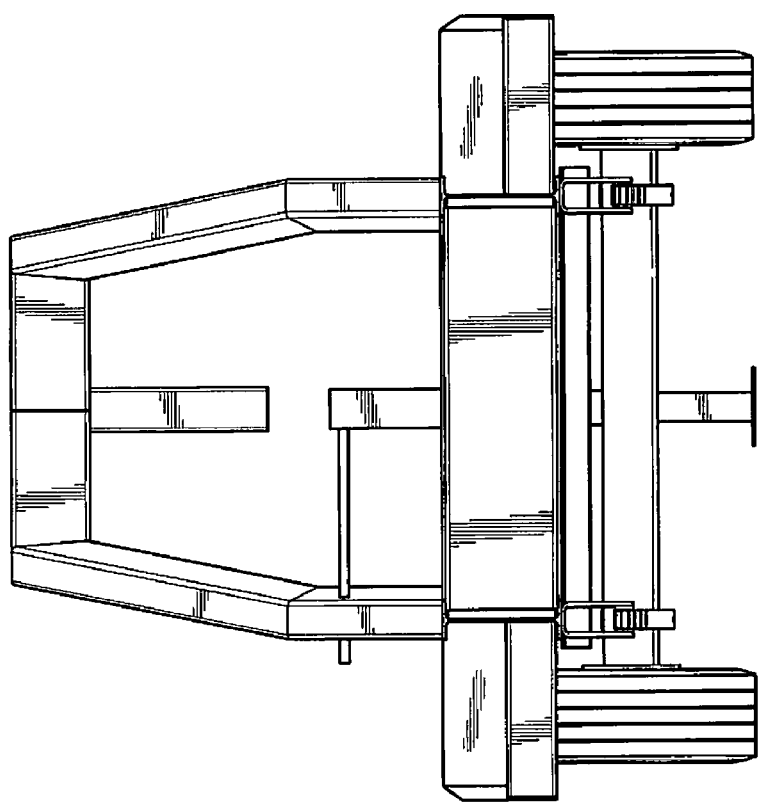
FIG. 7 is a schematic rear view of a trailer caddy according to an embodiment with a single axle.

FIG. 1 is a schematic perspective view of a trailer caddy 10 according to an embodiment with a single axle. FIG. 2 is a schematic exploded perspective view of a trailer caddy 10 according to an embodiment with a single axle. FIG. 3 is a schematic side view of a trailer caddy 10 according to an embodiment with a single axle. FIG. 4 is a schematic rear view of a trailer caddy 10 according to an embodiment with a single axle. FIG. 5 is a schematic perspective view of an alternate trailer caddy 10 embodiment with a single axle. FIG. 6 is a schematic side view of an alternate trailer caddy 10 embodiment with a single axle. FIG. 7 is a schematic rear view of an alternate trailer caddy 10 embodiment with a single axle.

Turning first to the front portion 14 as shown in FIGS. 1 through 7 and 9 through 12, a substantially horizontal support 22 having a fore end and an aft end is attached to the upper end of the one or more vertical posts 18 at the aft end. According to an embodiment, the substantially horizontal support 22 comprises a first substantially horizontal arm 24 attached to the upper end of the one or more vertical posts 18 at a first end, such that the angle of incidence between the vertical post 18 and the first substantially horizontal arm 24 is greater than 90 degrees. The range of angle of incidence is between 90 degrees and 160 degrees, according to an exemplary embodiment. According to a more preferred embodiment, the range of angle of incidence is between 100 degrees and 145 degrees. According to an even more preferred embodiment, the angle of incidence between the vertical post 18 and the first substantially horizontal arm 24 is approximately 105 degrees. According to an alternate embodiment, as illustrated in FIG. 5, the angle of incidence between the vertical post 18 and the first substantially horizontal arm 24 is approximately 145 degrees.

Abutting a second end of the first substantially horizontal arm 24 is a first end of a second substantially horizontal arm 26. According to an embodiment as shown in FIGS. 1 through 7 and 9 through 12, the second substantially horizontal arm 26 is at an angle of incidence to the one or more vertical posts 18 of 90 degrees. Abutting the second end of the second substantially horizontal arm 26 is the upper end of a vertical king-pin receiving structure 28, such that the angle of incidence between the second substantially horizontal arm 26 and the vertical king-pin receiving structure 28 is between 75 and 110 degrees, according to an embodiment. According to a preferred embodiment, the angle of incidence is between 80 and 90 degrees.

Figure 9:
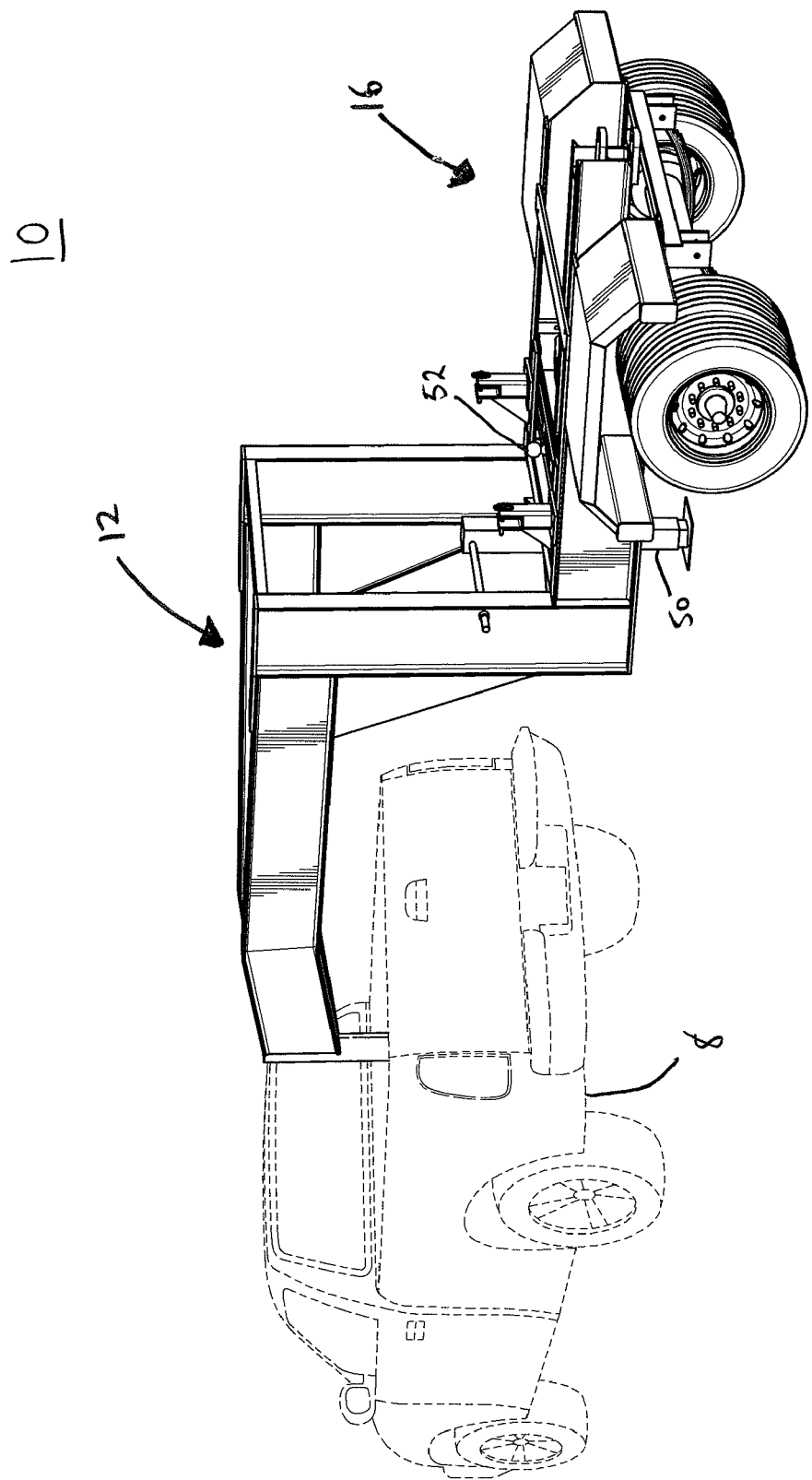
FIG. 9 is a schematic perspective view of a trailer caddy according to an embodiment attached to a kingpin located in the bed of a pickup truck.

The vertical king pin receiving structure 28 has an upper end and a lower end forming a recess at a right angle to the axis of the vertical structure 28. The recess has a king pin coupler located therein for receiving a king pin such as may be mounted in the pickup truck box of a pickup truck configured to tow a fifth-wheel trailer. According to an embodiment, when the king pin coupler is coupled to a king pin, the vertical king pin receiving structure is securely affixed to the king pin in such a manner that any apparatus attached to the vertical king pin receiving structure can be towed by horizontal movement of the king pin. FIG. 9 is a schematic perspective view of a trailer caddy according to an embodiment attached to a king-pin located in the bed of a pickup truck;

According to an embodiment, the rear portion 16 of the trailer caddy 10 comprises a single-axle trailer frame 30. According to an embodiment, the rear portion 16 of the trailer caddy 10 comprises a multi-axle trailer frame. In either the single-axle or multi-axle configuration, the trailer frame 30 includes a trailer connection assembly receiving channel 32 for receiving the trailer connection assembly 20, and securing the trailer connection assembly 20 into place in relation to the trailer caddy 10 so that trailers having various hitch designs can be affixed to the single-axle or multi-axle trailer frame 30 of the trailer caddy 10. The trailer connection assembly receiving channel 32 may comprise, according to an embodiment as shown in the figures, a substantially U-shaped channel as viewed from above, such that each wall of the channel has a substantially C-shaped profile. According to an embodiment, the U-shaped channel may be configured to receive a trailer connection assembly having a rectangular perimeter along three sides of the assembly 20. According to an alternative embodiment, the trailer connection assembly 20 may be permanently mounted to the trailer frame 30, such that the trailer connection assembly 20 cannot be easily removed.

The trailer chassis (e.g., trailer frame) may include one or more axles 34 having wheels 36 mounted thereon. Wheel wells 38 surround approximately the top one-half to one-third of the wheel 36 in order to protect the caddy 10 from dirt and debris that might otherwise be collected by the wheels 36 and deposited onto the surfaces of the caddy 10. The axle 34 (e.g., or axles), according to an embodiment, is attached to a frame comprising two I-beams 40 (each chamfered so that the respective I-beam 40 does not extend past either wheel well. A suspension system 42 (e.g., a leaf spring suspension system) links the axle 34 to the frame 30. In addition to the two I-beams 40, a cross-piece 44 (also an I-beam) connects a first end of each of the I-beams 40 together such that the cross-piece 44 is perpendicular to each of the I-beams 40, and the I-beams 40 are parallel to one another. The I-beams 40 have inside surfaces 46 and outside surfaces. On the inside surface 46 of each I-beam 40 is located a trailer connection assembly affixing member 48 that comprises a vertical bar that is removably attached to the inside surface 46 in a parallel position to a portion of the trailer connection assembly 20 that slides into the U-shaped channel formed by the I-beams 40 and cross-piece 44.

A jack 50 is provided integral to the trailer chassis just forward of the cross-piece 44 to aid in the connection of the trailer caddy 10 to a pickup truck 8, and to enable the trailer caddy 10 to be loaded with a towed article without being mounted to a pickup truck 8.

Figure 8:
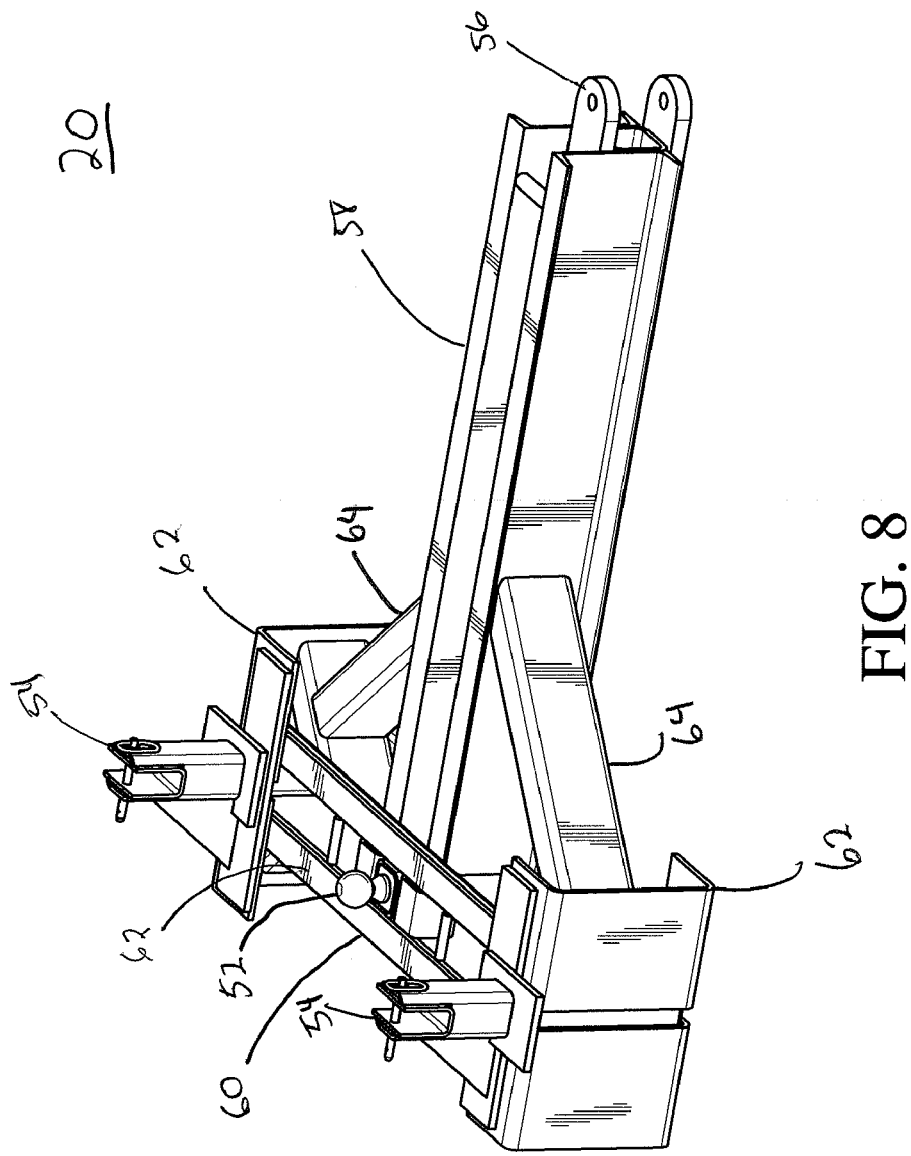
FIG. 8 is a schematic perspective view of the trailer connection assembly of a trailer caddy according to an embodiment, having three independent means of engaging implements.

FIG. 8 is a schematic perspective view of the trailer connection assembly 20 of a trailer caddy 10 according to an embodiment, having three independent means of engaging implements—a hitch ball 52, a two-point hitch 54 and a drawbar 56. As shown in FIGS. 2 and 8, the trailer connection assembly 20 may comprise a first set of opposing C-channels 58 and a second set of opposing C-channels 60 positioned perpendicularly to the first set 58 such that that a proximal end of the second set 60 abuts the first set 58 at about the horizontal center of the first set 58. Each set of opposing C-channels, according to an embodiment, comprises a first C-channel and a second C-channel positioned so that the channels are opposite one another.

According to an embodiment, the first set of opposing C-channels 58 has a top surface 62 with a tow ball 52 (e.g., or hitch ball) positioned thereon. The tow ball 52 enables a trailer having a tow ball receiving hitch to be secured to the tow ball 52 such that the tongue weight of the trailer is born by the trailer connection assembly 20, and the rear portion 16 of the trailer caddy 20.

At the ends of the first set of C-channels 58 are located U-shaped gliding elements 62 for aiding insertion of the trailer connection assembly 20 into the U-shaped channel of the trailer chassis. The gliding elements 62 are positioned so the channels face each other, in a parallel configuration. Two angled bracing elements 64 provide rigidity to the second set of opposing C-channels 60, attaching to the second set of C-channels 60 about the proximal end. The other end of the two angled bracing elements 64 terminates about the U-shaped gliding elements 62.

Mounted on either side of the tow ball 52, also on the top surface 62 of the first set of opposing C-channels 58, are the individual hitch receiving elements for a two-point hitch 54, one of the hitch receiving elements mounted on both ends of the first set of opposing C-channels 58. The individual hitch receiving elements for a two-point hitch 54 enable a two-point hitch to be secured to the hitch receiving elements such that the tongue weight of a trailer or agricultural implement attached to the two point hitch is born by the trailer connection assembly, and the rear portion of the trailer caddy.

Located at the distal end of the second set of opposing C-channels 60, between the opposing C-channels, is a drawbar 56 for receiving a pin-type hitch, such as those used on agricultural implements. According to an embodiment, the drawbar may be received by the receiving element of a pin-type hitch and attached to the receiving element with a pin so that the tongue weight of an agricultural implement attached to the receiving element is born by the trailer connection assembly, and the rear portion of the trailer caddy.

A method of coupling a towed article to a trailer caddy 10 for towing involves the acts of positioning the hitch of the towed article in position proximate to the appropriate style of hitch connector on the trailer caddy 10 and coupling the hitch of the towed article to appropriate style of hitch connector mounted on the chassis. Once coupled, the towed article (e.g., trailer, agricultural implement) is securely fastened to the trailer caddy 10 and such that the trailer caddy 10 can then be attached to a pickup truck 8 for mobilizing the towed article.

According to an embodiment, a hydraulic lifting assembly (not shown) is provided for lifting an article that the operator desires to tow. Once placed under the trailer tongue of the article to be towed, a hydraulic jack assembly of the hydraulic lifting assembly is actuated so that the hydraulic jack lifts the trailer tongue of the article to be towed so that the trailer chassis and the attached trailer connection assembly can be positioned underneath the trailer tongue. Once positioned underneath the trailer tongue adjacent to the appropriate style of hitch connector for the article to be towed, the hydraulic jack of the hydraulic lifting assembly is actuated so that the hydraulic jacks lowers the trailer tongue and associated coupler into the hitch connector on the trailer connection assembly to be coupled to the trailer caddy. The hydraulic jack is then disassembled into two components: a stand component and an extension component. The stand component is attached to the pickup truck facing side of the trailer chassis on one side of the manual jack, and the extension component is attached to the pickup truck facing side of the trailer chassis on the other side of the manual jack for storage. The hydraulic lifting assembly comprises a hydraulic tank, hydraulic pump, a power source and the hydraulic jack. The hydraulic pump is in fluid communication with a hydraulic cylinder located inside a vertical tube of the stand component. The vertical tube has a rectangular cross-section, according to an embodiment. In addition to the vertical tube, the stand component comprises a planar base piece that sits flat against the ground when the hydraulic jack is in use, and angled brace pieces that support the vertical tube from each of the tubes four outside surfaces. Inside the vertical tube is an interior tube that moves in relation to the vertical tube. The interior tube is attached to a piston of the hydraulic cylinder (attached at one end to the vertical cylinder) such that vertical movement of the piston is translated into vertical movement of the interior tube relative to the vertical tube. The extension component attaches to the interior tube through an aperture extending horizontally through a portion of the interior tube. A pin is placed through one of many desired apertures extending horizontally through the extension component so that the pin passes through both the extension component and the interior tube of the stand component. The hydraulic pump is in fluid communication with the hydraulic cylinder using hydraulic hoses, according to an embodiment. The hydraulic cylinder, a reservoir of hydraulic fluid, and the power source are contained within a hydraulic lifting assembly container. According to one embodiment, the hydraulic lifting assembly container has the dimensions of 41½ inches in width, 13 inches in height and 10 inches in depth. According to an embodiment, the dimensions of the vertical tube are 4 inches wide by 4 inches deep by 3 feet tall. According to an embodiment, the dimensions of the interior tube are 3½ inches wide by 3½ inches deep by 3 feet tall. According to an embodiment, the hydraulic cylinder is 3 inches in diameter and twelve inches long. One skilled in the art will recognize that other dimensions could be used to create a hydraulic jack of the hydraulic lifting assembly without departing from the primary goal of an embodiment.

Figure 10:
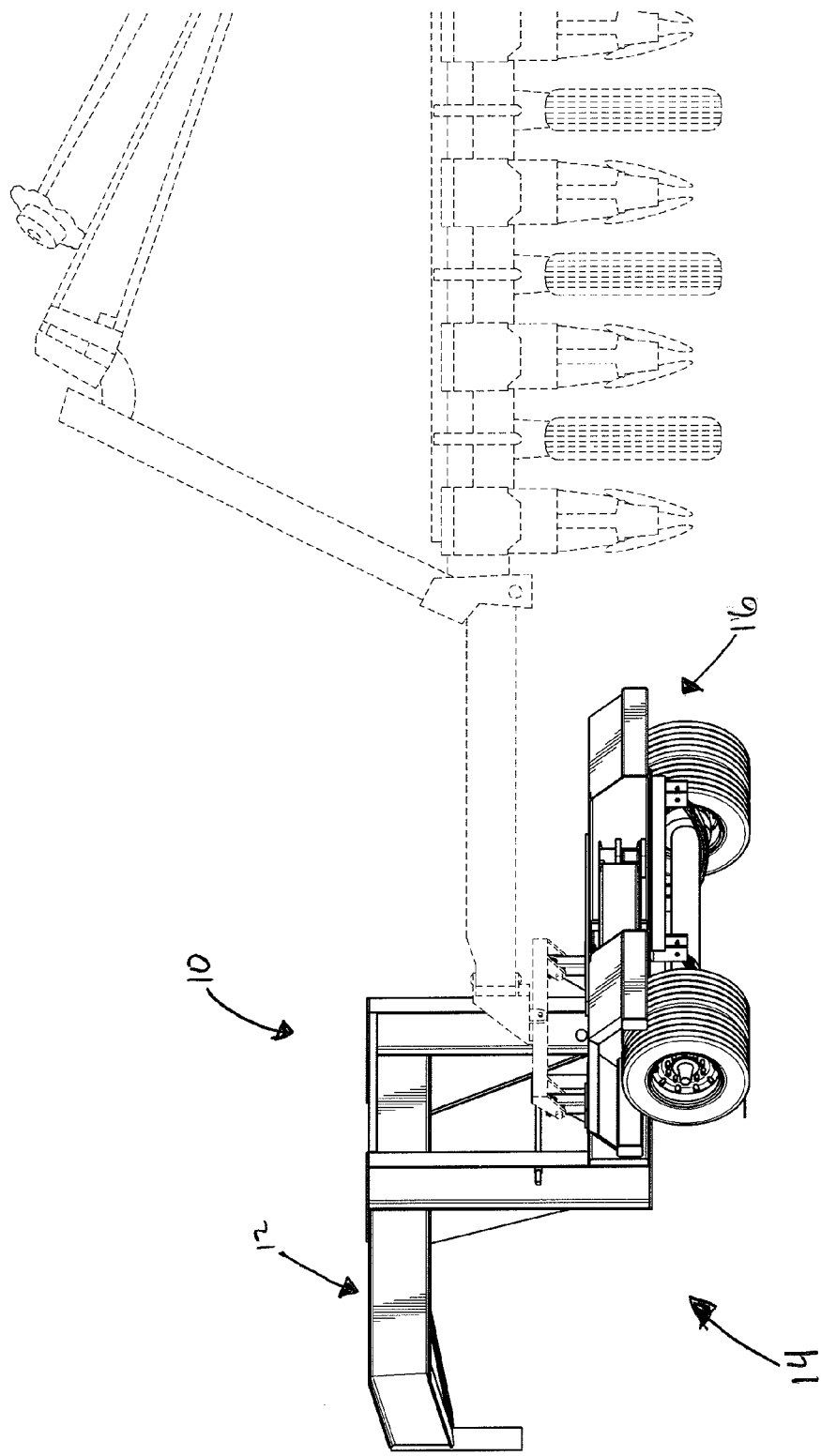
FIG. 10 is a schematic perspective view of a trailer caddy according to an embodiment with an agricultural implement attached to the two point hitch of the hitching assembly.
Figure 11:
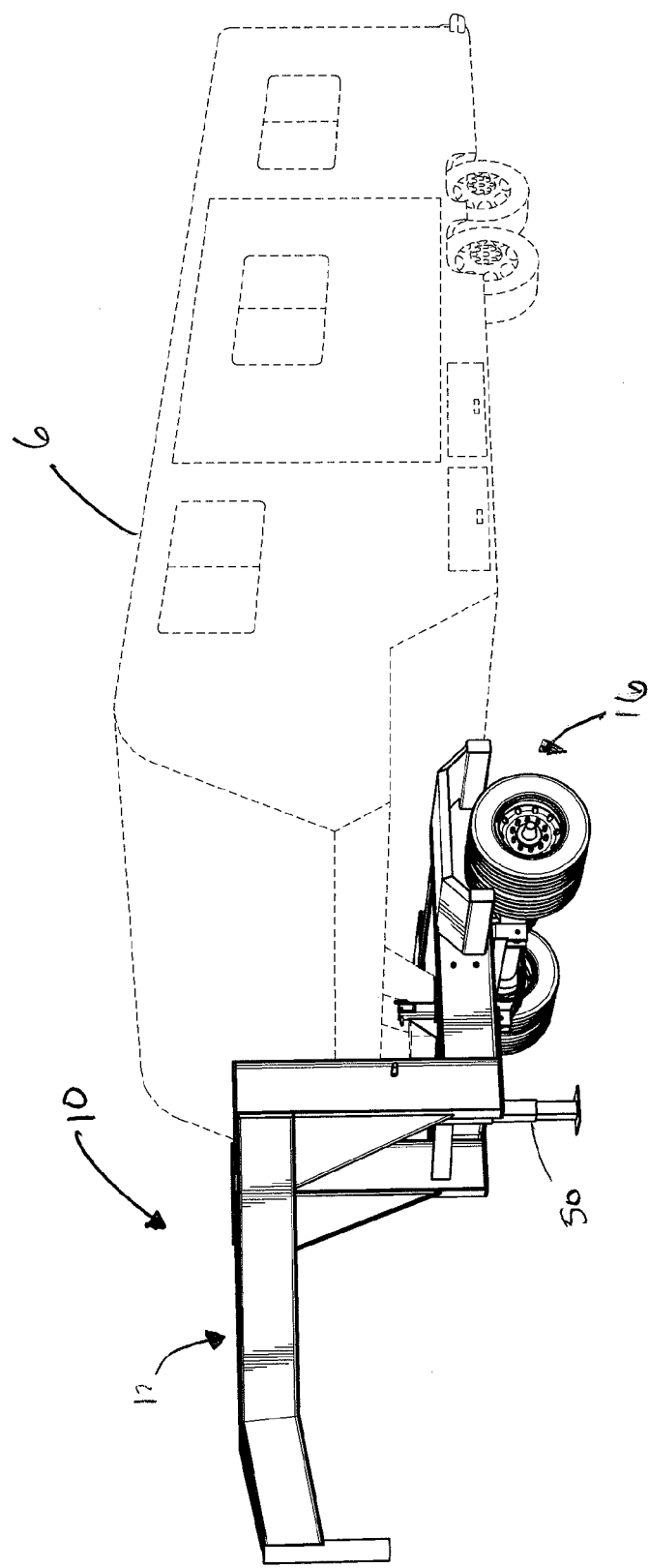
FIG. 11 is a schematic perspective view of a trailer caddy according to an embodiment with fifth-wheel travel-trailer attached to the fifth-wheel hitch of the hitching assembly.
Figure 12:
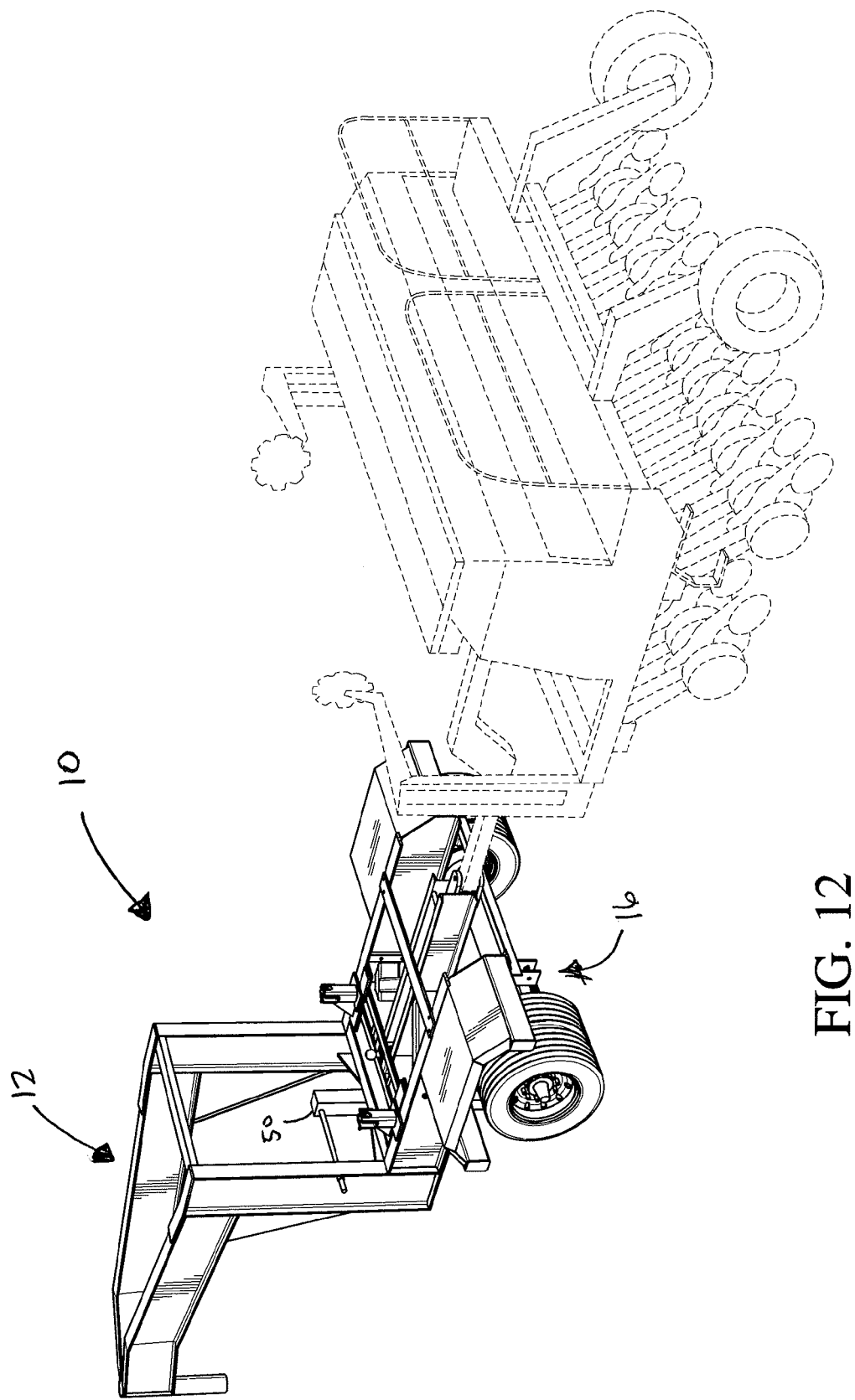
FIG. 12 is a schematic perspective view of a trailer caddy according to an embodiment with an agricultural implement attached to the drawbar of the hitching assembly.

FIG. 10 is a schematic perspective view of a trailer caddy 10 according to an embodiment with an agricultural implement attached to the two-point hitch 54 of the hitching assembly 30. FIG. 11 is a schematic perspective view of a trailer caddy 10 according to an embodiment with fifth-wheel travel-trailer 6 attached to the fifth-wheel hitch 52 of the hitching assembly 30. FIG. 12 is a schematic perspective view of a trailer caddy 10 according to an embodiment with an agricultural implement attached to the drawbar 56 of the hitching assembly 30.

A method of towing a towed article with a tongue weight that exceeds the towing vehicles capacity by employing a trailer caddy 10 having a chassis with at least one axle 34 and wheels 36 mounted thereto includes the acts of coupling the fifth wheel hitch 12 of the chassis to a pickup truck 8, positioning the hitch of the towed article in position proximate to the appropriate style of hitch connector on the trailer caddy 10, coupling the hitch of the towed article to appropriate style of hitch connector mounted on the chassis, and manipulating the location and position of the towing vehicle to impart a desired motion upon the trailer caddy 10 and on the towed article coupled to the trailer caddy 10. Because the trailer caddy 10 has its own axle (or axles), it has a separate rating for tongue weight of towed articles than its tow vehicle. This enables an otherwise underrated tow vehicle to be able to manipulate the position of or tow a towed article, such as a trailer, a motorhome or a piece of agricultural equipment.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

In view of the exemplary apparatus and methods described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Therefore, the present invention should not be limited to any single embodiment, but rather should be construed in breadth and scope in accordance with the appended claims.

What is claimed is:

1. A trailer caddy comprising:
    a single-axle trailer chassis, the single-axle chassis having wheels mounted thereon;
    a fifth-wheel hitch having a frame, the frame being affixed to the chassis such that the frame faces opposite the chassis; and
    a hitch assembly mounted on the single-axle trailer chassis, configured to connect to various towed vehicle hitch;
wherein the hitch assembly comprises:
    a first set of opposing C-channels;
    a second set of opposing C-channels positioned perpendicularly to the first set such that that a proximal end of the second set abuts the first set at about the horizontal center of the first set.

2. A trailer caddy according to claim 1, wherein each set of opposing C-channels comprises:
    a first C-channel; and
    a second C-channel positioned so that the second C-channel is opposite the first C-channel.

3. A trailer caddy according to claim 1, wherein the hitch assembly comprises a tow ball.

4. A trailer caddy according to claim 1, wherein the hitch assembly comprises a set of two-point hitch connectors, configured to receive a two-point hitch.

5. A trailer caddy according to claim 1, wherein the hitch assembly comprises a drawbar.

6. A trailer caddy according to claim 1, wherein the hitch assembly comprises:
   a tow ball secured to a top surface of the hitch assembly;
   a set of two-point hitch connectors located on either side of the hitch assembly, configured to receive a two-point hitch; and
   a drawbar secured to a distal end of the second set of opposing C-channels.

7. A trailer caddy according to claim 1, wherein the hitch assembly comprises a tow ball mounted on a top surface of the first set of opposing C-channels.

8. A trailer caddy according to claim 1, wherein the hitch assembly comprises a set of two-point hitch connectors located on the first set of opposing C-channels such that the two-point hitch connectors are mounted on both sides of the tow ball.

9. A trailer caddy according to claim 1, wherein the hitch assembly comprises a drawbar secured to a distal end of the second set of opposing C-channels.

10. A trailer caddy according to claim 1, wherein the hitch assembly is removable.

* * * * *